A. B. FARQUHAR.
Horse-Power.
No. 209,032.  Patented Oct. 15, 1878.
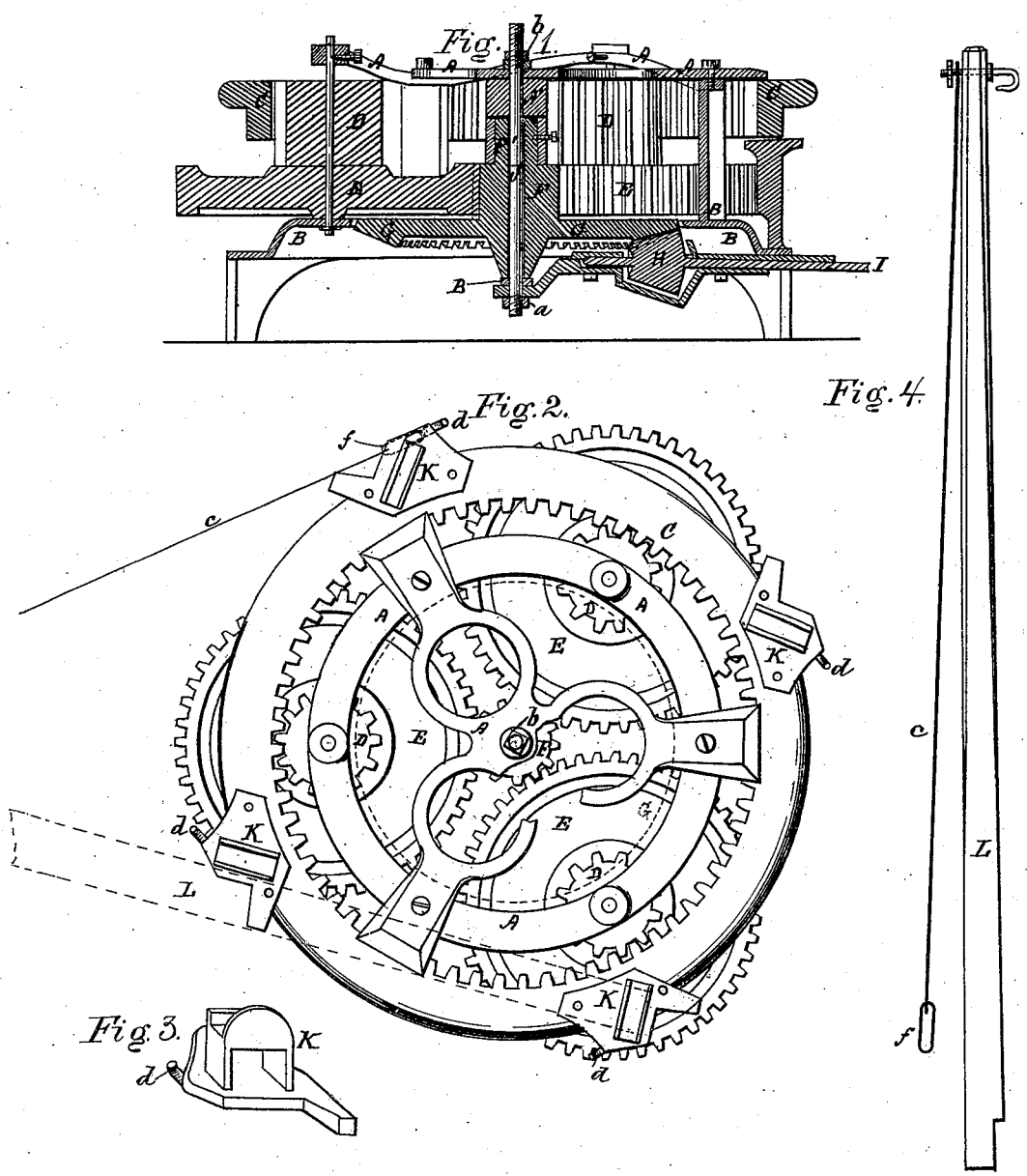

UNITED STATES PATENT OFFICE.

ARTHUR B. FARQUHAR, OF YORK, PENNSYLVANIA.

IMPROVEMENT IN HORSE-POWERS.

Specification forming part of Letters Patent No. 209,032, dated October 15, 1878; application filed October 3, 1878.

*To all whom it may concern:*

Be it known that I, ARTHUR B. FARQUHAR, of York, Pennsylvania, have invented certain new and useful Improvements in Horse-Powers, of which the following is a specification:

My invention relates to what are known as "triple-gear horse-powers." One practical difficulty which is encountered in the use of such a power is the liability of the bevel or ground wheel to rise and get out of gear with the pinion on the shaft that is driven by said wheel. Various remedies for this difficulty have been tried. One plan has been to provide slides arranged over the wheel to hold it down in place; but these devices afford only temporary relief, for they soon wear away, and, moreover, act as brakes, consuming about one-fourth of the power. Rollers have also been placed over the ground-wheel; but they are short-lived and unsatisfactory, being open in great measure to the same objection that obtains against the use of slides. Attempt has also been made to keep the wheel down by providing a bearing against its stem; but this is also practically a failure, for after a little wear the wheel will strain the support up and spring out of gear and break up.

So great has been the difficulty above named that the triple-gear power, advantageous as it is in many respects, has been gradually going out of use.

My invention is designed to afford an entire remedy for the difficulty. It has been thoroughly tested in many working machines now in use, and has been found entirely satisfactory.

I run the bevel or ground wheel on an axle or journal, one end of which extends through the lower part of the frame of the power, and is there secured by a nut or other means, while the other end extends up through the top part of the frame, and is screw-threaded to receive a nut which screws down upon the said top part of the frame. The axle or journal of the ground-wheel thus in effect becomes a central stay, which connects and binds together the upper and lower parts of the power-frame and prevents effectually the rising or displacement of the ground-wheel.

But my invention can best be explained and understood by reference to the accompanying drawing, in which Figure 1 is a vertical central section of a triple-gear power made in accordance with my invention. Fig. 2 is a plan of the same, with the top part of the frame partly broken away. Fig. 3 is a detached view, in perspective, of one of the boxes for holding the levers. Fig. 4 is a plan of one of the levers.

The general arrangement and combination of the gearing is similar to that in other triple-gear horse-powers, and will therefore require no specific and detailed description.

A and B are the top and bottom parts of the supporting-frame. C is the master-wheel. D are pinions gearing with the master-wheel, and fastened on the same shaft or axle with their respective wheels E. These wheels in turn gear with the center pinion, F, which is fast to the bevel or ground wheel G. The latter gears with a bevel-pinion, H, on the shaft I, which transmits the power to the machinery to be driven or operated, and has its bearings in or supported by the part B of the frame.

The bevel-wheel G and its pinion F are mounted and revolve on a central axle or shaft, J. It is in the particular arrangement and combination of this axle or shaft with the bevel-wheel and the frame that my invention principally resides.

The shaft or axle at its lower end passes through the lower part, B, of the frame, and upon its projecting lower end is a nut, $a$, by which it is there held in place. Any other suitable means by which the lower end of the shaft or axle will be made fast to the lower part of the frame may be employed. The said shaft or axle passes up centrally through the machine, its upper end passing through and above the top part, A, of the frame. Its projecting upper end is screw-threaded, as shown, to receive a nut, $b$, which screws down upon the upper part, A. By this means the two heads of the frame are drawn tightly together, and are rendered absolutely incapable of springing apart. The bevel-wheel and its pinion are thus bound securely between the two heads by means of the same shaft which serves as their axle or journal, the hub F' of the pinion bearing against a central boss, A', on the under side of the part A, and the hub of the bevel-wheel bearing against the frame part B. Under this arrangement, while the bevel-wheel can revolve freely and without undue friction, it is nevertheless held down with certainty, the two parts of the frame being so braced and strengthened by the central axle and binding-rod, J, as to be free from liability of springing apart.

The master-wheel C is provided with boxes K, to receive the levers L, provided with stay-rods c. The relative arrangement of the boxes is shown in Fig. 2, where also is indicated the position of one of the levers and its stay-rod. One of the boxes is shown detached in Fig. 3. It is provided on its under side with a hook, d, which engages the eye or link f of the stay-rod of one of the levers. For four levers there are four boxes arranged at equal distances apart on the master-wheel. Each lever, as indicated, has its hub received in one of the boxes, bears at a point intermediate between its two ends against the face of the box next on its left, and its stay-rod engages the hook of the box next succeeding the box last named. This construction and arrangement of the boxes I believe to be novel with me.

Having described my invention, what I claim and desire to secure by Letters Patent, is as follows:

1. In triple-gear horse-powers, the combination, with the bevel or ground wheel and the power-supporting frame, of a central shaft, which forms at once an axle or journal on which the bevel-wheel revolves, and a connecting-rod to bind tightly and securely together the two parts of the frame in the line of the lifting-strain exerted by the bevel-wheel, as and for the purposes set forth.

2. The lever-boxes, constructed each with a hook, and arranged on the master-wheel, to engage and support the levers and their stay-rods, as shown and described.

In testimony whereof I have hereunto set my hand this 1st day of October, 1878.

ARTHUR B. FARQUHAR.

Witnesses:
WM. BEITZEL,
THOS. H. FULTON.